United States Patent

Ochiai et al.

[11] Patent Number: 5,099,717
[45] Date of Patent: Mar. 31, 1992

[54] MOTOR CASE END PLATE STRUCTURE

[75] Inventors: Takao Ochiai, Tochigi; Noboru Miyata, Gumma; Takao Umezawa, Gumma; Keiichi Bendo, Gumma, all of Japan

[73] Assignee: Mitsuba Electric Manufacturing Co., Ltd., Kiryu, Japan

[21] Appl. No.: 472,088

[22] Filed: Jan. 30, 1990

[30] Foreign Application Priority Data

Jan. 31, 1989 [JP] Japan .................. 1-10714[U]

[51] Int. Cl.⁵ .................. F16H 57/02; F16H 1/16
[52] U.S. Cl. .................. 74/606 R; 74/425; 220/358
[58] Field of Search .................. 74/425, 606 R, 467; 220/327, 358

[56] References Cited

U.S. PATENT DOCUMENTS

| | | | |
|---|---|---|---|
| 1,752,333 | 4/1930 | Clark | 74/425 |
| 3,034,703 | 5/1962 | Fetter | 220/327 |
| 3,082,645 | 3/1963 | Chiarello | 74/606 R |
| 3,276,288 | 10/1966 | Fry | 74/606 R |
| 3,373,637 | 3/1968 | Behnke | 74/425 |
| 3,446,085 | 5/1969 | Ginsberg | 74/425 |
| 4,233,697 | 11/1980 | Cornwall | 220/327 |
| 4,333,358 | 6/1982 | Grattapaglia | 76/606 R X |
| 4,703,724 | 11/1987 | Candea et al. | 74/467 |
| 4,796,486 | 1/1989 | Binger et al. | 74/606 R |
| 4,885,948 | 12/1989 | Thrasher, Jr. et al. | 74/425 |

Primary Examiner—Leslie A. Braun
Assistant Examiner—Winnie Yip
Attorney, Agent, or Firm—Marshall & Melhorn

[57] ABSTRACT

A motor case end plate structure, comprising: a motor case accommodating a motor unit therein and provided with a first radial bearing for a rotor shaft of the motor unit; a radial flange provided at an open end of the motor case; and an end plate, made of molded synthetic resin, having a second radial bearing for the rotor shaft and adapted to be attached to the motor case by way of the flange; the end plate being provided with at least three separate peripheral mounting surfaces disposed around the rotor shaft and projecting from surrounding parts so as to substantially directly abut an outer end surface of the flange of the motor case. Thereby, any error in the planeness of the mounting surfaces or any error in their perpendicularity with respect to the axial line of the motor unit can be readily corrected by shaping the part of the die for molding the end plate corresponding to the mounting surface to be corrected without requiring excessive cost or time. Thus, an exact alignment between the motor case and the end plate can be accomplished in an economical fashion.

4 Claims, 2 Drawing Sheets

MOTOR CASE END PLATE STRUCTURE

TECHNICAL FIELD

The present invention relates to a motor case end plate structure and in particular to an end plate structure for mounting an end plate made of synthetic resin onto a flanged end portion of a motor casing.

BACKGROUND OF THE INVENTION

There are many kinds of motor powered devices which are currently used in automobiles, and they are required to be light-weight and compact. Such a motor powered device typically includes a cylindrical metal case serving also as a magnetic yoke for its motor unit, and one end of the case is closed so as to accommodate a bearing for supporting one end of a rotor shaft of the motor unit while the other end of the motor case is provided with a flange for mounting an end plate thereon. The end plate accommodates another bearing for the rotor shaft. It is advantageous to utilize the end plate as a part of the case for a speed reduction gear as such a motor unit is typically equipped with a speed reduction gear unit. The end plate may be made of cast metal, but it is more advantageous in terms of manufacturing cost to make it from molded synthetic resin.

However, particularly when the end plate is made of synthetic resin, some difficult arises in ensuring the precision of the plane onto which the flange of the motor case abuts, and an exact alignment of the central axial lines of the motor unit and the end plate, in particular those of the two bearings supporting the two ends of a rotor shaft, is difficult to achieve because of the deformation of the end plate as it is cooled after being molded. The mutual alignment of the two bearings is important in ensuring the quiet operation of the motor, the durability of the bearings, and the reduction of the friction loss of the motor unit. It is conceivable to appropriately shape the molding die by taking into account the deformation which the molded end plate is expected to undergo after being molded. However, it will require a special machining process which is time consuming and requires a special skill. Alternatively, the mounting surface may be machined after it is molded. However, it also will require an additional machining process which adds to the manufacturing cost. Thus, it has been desired to obtain a motor case end plate structure which is economical to manufacture and can offer a high dimensional accuracy.

BRIEF SUMMARY OF THE INVENTION

In view of such problems of the prior art, a primary object of the present invention is to provide a motor case end plate structure which can ensure a high level of axial alignment between a motor unit and an end plate.

A second object of the present invention is to provide a motor case end plate structure which can ensure a good sealing capability.

A third object of the present invention is to provide a motor case end plate structure which is economical to manufacture.

A fourth object of the present invention is to provide a motor case end plate structure which is easy to assemble.

According to the present invention, these and other objects can be accomplished by providing a motor case end plate structure, comprising: a motor case accommodating a motor unit therein and provided with a first radial bearing for a rotor shaft of the motor unit; a radial flange provided at an open end of the motor case; and an end plate, made of molded synthetic resin, having a second radial bearing for the rotor shaft, and adapted to be attached to the motor case by way of the flange; the end plate being provided with at least three separate peripheral mounting surfaces disposed around the rotor shaft and projecting from surrounding parts so as to substantially directly abut an axial outer end surface of the flange of the motor case.

Thereby, any error in the planeness of the mounting surfaces or any error in their perpendicularity with respect to the axial line of the motor unit can be readily corrected by shaping the part of the die for molding the end plate corresponding to the mounting surface to be corrected without requiring excessive cost or time. Thus, an exact alignment between the motor case and the end plate can be accomplished in an economical fashion. This contributes to the quiet operation of the motor, the improvement in the durability of the bearings, the reduction of the friction loss of the motor unit, and improvement in the sealing between the abutting surfaces of the motor unit and the end plate.

According to a preferred embodiment of the present invention, the end plate is provided with a boss adapted to be closely fitted into the open end of the motor case and an annular mounting surface surrounding the boss immediately around thereof and disposed lower than the peripheral mounting surfaces to receive a gasket therein. In this way, mechanically strong and highly air tight structure can be obtained with a minimum effort and cost.

Preferably, since such a motor unit is typically equipped with a speed reduction gear unit, to the end of simplifying the assembling process of the motor unit, the end plate may be integrally formed with a gear case accommodating a speed reduction gear unit therein.

BRIEF DESCRIPTION OF THE DRAWINGS

Now the present invention is described in the following in terms of a specific embodiment with reference to the appended drawings, in which.

DETAILED DESCRIPTION OF THE PREFERRED EMBODIMENT(S)

Figure 1:
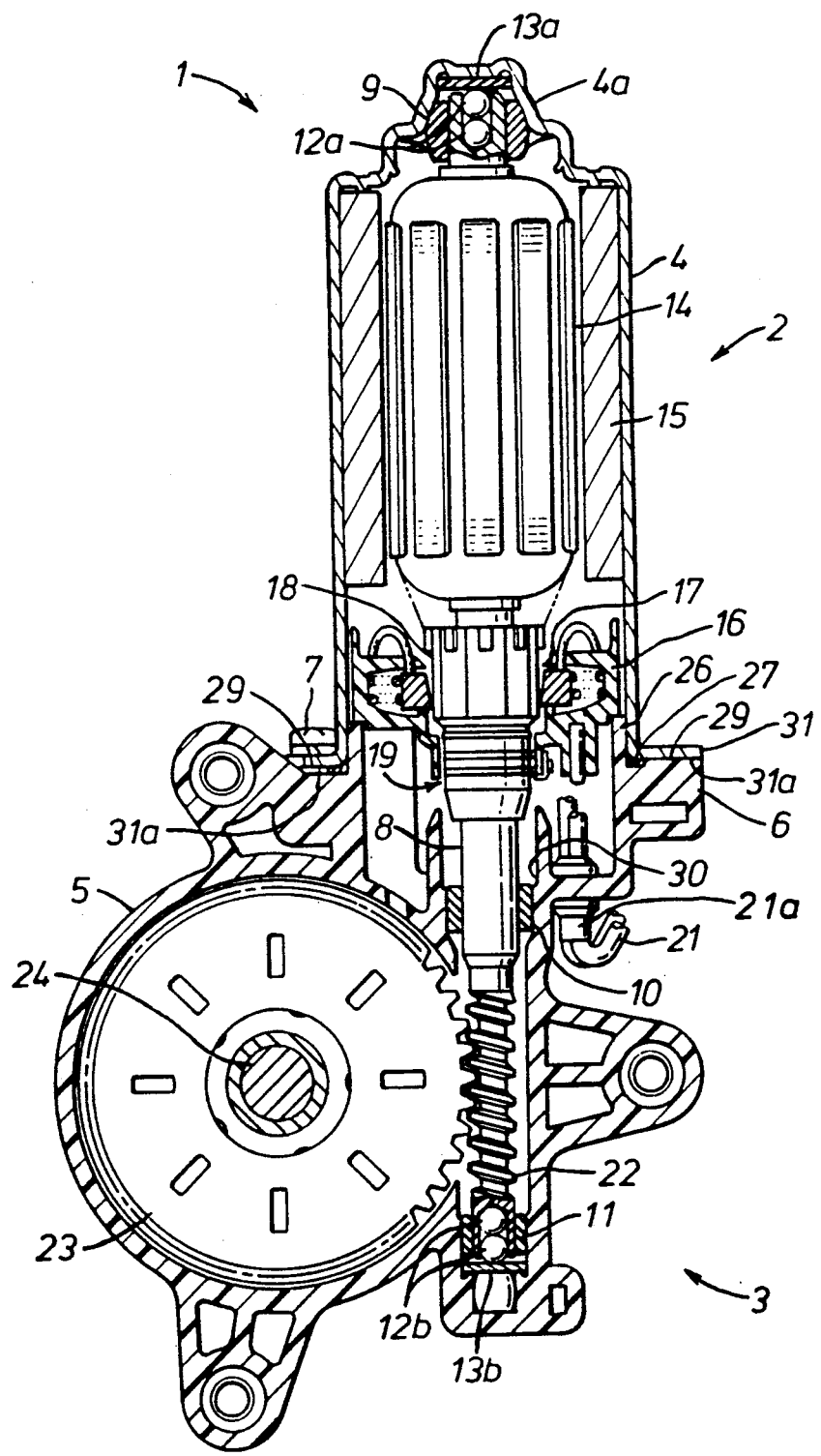
FIG. 1 is a sectional view of a motor device to which the present invention is applied.

FIG. 1 is a longitudinal sectional view of an automotive power window motor device 1 to which the present invention is applied. This motor device 1 consists of a DC motor unit 2 and a speed reduction gear unit 3, and is adapted to be installed in a door of an automobile. The motor unit 2 is provided with a cylindrical yoke 4 serving as a motor case which is closed at its one end 4a and is attached to an end plate 6 at its other end. The end plate 6 is made of molded synthetic resin and is integrally formed with a gear case 5 accommodating a speed reduction gear unit 3 therein. Alternatively, the end plate 6 along with the gear case 5 may be made integrally from cast aluminum alloy. The end plate 6 is attached to the open end of the yoke 4 by way of a flange 31 provided at the open 25 end of the yoke 4, and a plurality of screws 7 passed through holes 31b provided in the flange 31 and threaded into associated threaded holes 6a provided in the end plate 6.

The closed end 4a of the yoke 4 is provided with a radial slide bearing 9 for rotatably supporting an end of a rotor shaft 8 of the motor unit 2. The end plate 6 is also provided with a second radial slide bearing 10 for rotatably supporting an intermediate part of the rotor shaft 8 and a third radial slide bearing 11 rotatably supporting the other end of the rotor shaft 8. Each longitudinal end of the rotor shaft 8 is provided with an axial hole receiving a pair of steel balls 12a or 12b so as to abut a thrust plate 13a or 13b provided at an associated part of the closed end of the yoke 4 or the gear case 5, as the case may be, and to serve as a thrust bearing.

The motor unit 2 consists of a DC motor which is known by itself and comprises an armature 14 attached to the rotor shaft 8 between the first and second slide bearings 9 and 10, and a pair of semi-circular permanent magnet pieces 15 attached to the inner circumferential surface of the yoke 4 and disposed around the armature 14 in a concentric manner. The end plate 6 is provided with a pair of brush holders 16 which project into the yoke 4 when the end plate 6 is mounted on the yoke 4, and brushes 17 supported by the brush holders 16 are elastically urged by means of compression coil springs toward a commutator 18 integrally mounted on the rotor shaft 8 and slide over the surface of the commutator 18 as the rotor shaft 8 rotates.

The rotor shaft 8 is integrally provided with a slip ring 19 between the commutator 18 and the second slide bearing 10 for producing a signal indicative of the rotational speed of the rotor shaft 8 by cooperating with brushes mounted on an extension of one of the brush holders 16. Lead wires 21 connected to the brushes 17 for the commutator 18 and the brushes for the slip ring 19 are passed through a grommet 21a fitted into an opening provided in the end plate 6.

The part of the rotor shaft 8 located between the second and third slide bearings 10 and 11 is formed into a worm 22 which meshes with a worm wheel 23 rotatably mounted in the gear case 5. An output shaft 24 integrally attached to this worm wheel 23 integrally carries a sector gear (not shown in the drawings) which forms a part of a known power window mechanism.

Figure 2:
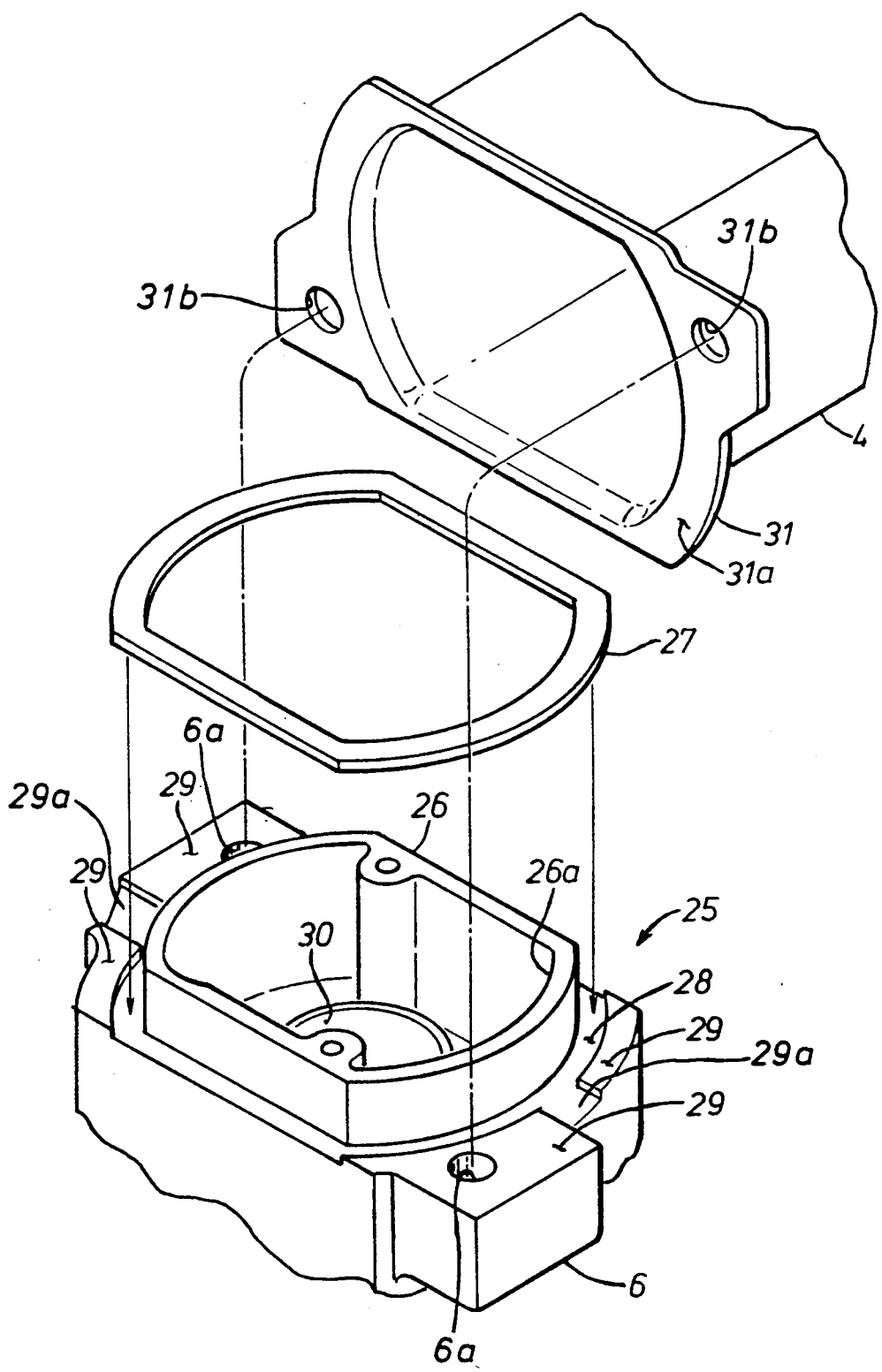
FIG. 2 is an exploded perspective view of a preferred embodiment of the present invention.

In this motor device 1, as best shown in FIG. 2, an annular base 26 is provided in the past of the end plate 6 facing the yoke 4 so that this boss 26 may closely fit into the open end of the yoke 4. The boss 26 accommodates the aforementioned slip ring 19, and the second slide bearing 10 is secured in a collared opening 30 provided in a bottom part of a cavity defined inside the boss 26.

As shown in FIG. 2, the outer end surface 31a of the flange 31 is substantially planar and perpendicular to the longitudinal line of the motor unit 2. The end surface of the end plate 6 opposing the outer end surface 31a of the flange 31 is provided with a planar and annular mounting surface 28 immediately around the boss 26 so as to interpose a gasket 27 between this mounting surface 28 and the outer end surface 31a of the flange 31. This annular mounting surface 28 is surrounded by four projecting peripheral mounting surfaces 29 which are located diagonally opposed positions around the annular mounting surface 28. These peripheral mounting surfaces 29 are higher than the annular mounting surface 28. This part of the end plate 25 is generally elliptic in cross section and the peripheral mounting surfaces 29 are paired on either side of a short axis of this hypothetical elliptic shape, and the pair of the peripheral mounting surfaces 29 on each side are separated from each other by a radial groove 29a.

Thus, when the yoke 4 and the end plate 6 are joined together with a gasket 27 placed therebetween, the gasket 27 is interposed between the outer axial end surface 31a of the flange 31 and the annular mounting surface 28 while the four peripheral mounting surfaces 29 directly abut the outer end surface 31a of the flange 31. Thus, the four peripheral mounting surfaces 29 ensure mechanical strength of the coupling between the yoke 4 and the end plate 6 while the gasket 27 ensures air tightness therebetween.

The mutual position between the yoke 4 and the end plate 6 is determined by the abutment between the four peripheral mounting surfaces 29 and the outer end surface 31a of the flange 31. Therefore, should any error arise in the planeness or the relative height between the peripheral mounting surfaces, it can be readily corrected by appropriately modifying the associated part of the molding die for molding this end plate 6. Therefore, any possible misalignment between the central axial lines of the yoke 4 and the end plate 6 can be corrected with a minimum amount of effort and time. The improved precision in the alignment of the yoke 4 and the end plate 6 which is made possible by the present invention ensures improved durability of the motor unit through elimination of excessive load which would otherwise be caused to the bearings 8 through 10.

The peripheral mounting surfaces 29 were separated into four parts in the above described embodiment, but it is possible to achieve a same result by separating the peripheral mounting surfaces into three or more parts.

What we claim is:

1. A motor case end plate structure, comprising:
   a motor case accommodating a motor unit therein and provided with a first radial bearing for a rotor shaft of said motor unit;
   a radial flange provided at an open end of said motor case; and
   an end plate, made of molded synthetic resin, having a second radial bearing for said rotor shaft and a boss adapted to be closely fitted into said open end of said motor case, the end plate adapted to be attached to said motor case by way of said flange;
   said end plate abutting said flange solely by three or more circumferentially separated peripheral mounting surfaces disposed around said boss and projecting from surrounding parts so as to substantially directly abut an outer axial end surface of said flange of said motor case.

2. A motor case end plate structure according to claim 1, wherein said end plate is integrally formed with a gear case accommodating a speed reduction gear unit therein.

3. A motor case end plate structure, comprising:
   a motor case accommodating a motor unit therein and provided with a first radial bearing for a rotor shaft of said motor unit;
   a radial flange provided at an open end of said motor case; and
   an end plate, made of molded synthetic resin, having a second radial bearing for said rotor shaft, and adapted to be attached to said motor case by way of said flange around said rotor shaft;
   said end plate being provided with at least three separate peripheral mounting surfaces disposed around said rotor shaft and projecting from surrounding parts so as to substantially directly abut an outer axial end surface of said flange of said motor case, a boss adapted to be closely fitted into said open end of said motor case, and an annular recess surrounding said boss immediately around it and disposed lower than said peripheral mounting surfaces to receive a gasket therein.

4. A motor case end plate structure according to claim 2, wherein said end plate is integrally formed with a gear case accommodating a speed reduction gear unit therein.

* * * * *